Jan. 1, 1952  H. W. KOST  2,580,930
RETAINER DEVICE FOR TOOLS
Filed Jan. 17, 1951

INVENTOR.
Harold W. Kost
BY
*Malcolm W. Fraser*
ATTORNEY

Patented Jan. 1, 1952

2,580,930

UNITED STATES PATENT OFFICE 2,580,930

RETAINER DEVICE FOR TOOLS

Harold W. Kost, Toledo, Ohio, assignor to Prestole Corporation, Toledo, Ohio, a corporation of Michigan Original application September 16, 1948, Serial No. 49,539. Divided and this application January 17, 1951, Serial No. 206,480

2 Claims. (Cl. 279—79)

This invention relates to tool retainers, but more particularly to retainers for detachably securing tools such, for example, as dies and punches, the same being incorporated in the fixture for the tool, and an object is to produce a new and improved tool retainer having the novel features of construction, operation and arrangement hereinafter described.

For purposes of illustration but not of limitation, embodiments of the invention are shown in the accompanying drawings, in which Figure 1 is a vertical sectional elevation through a fixture equipped with my improved tool retainer and showing a cylindrical portion mounted in position of use;

Figure 7:
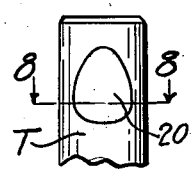
Figure 7 is a fragmentary end elevation showing the upper or inner end of the tool shank provided with a cam surface.
Figure 8:
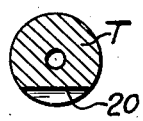
Figure 8 is a transverse sectional view on the line 8—8 of Figure 7.
Figure 1:
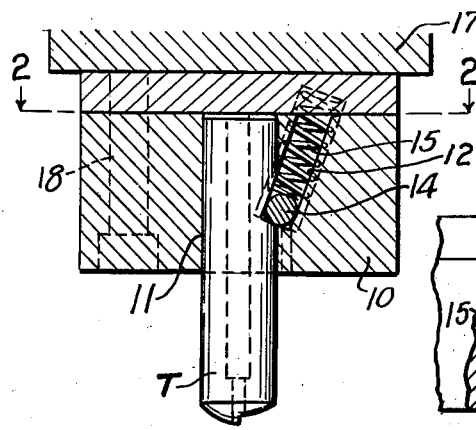
Figure 5:
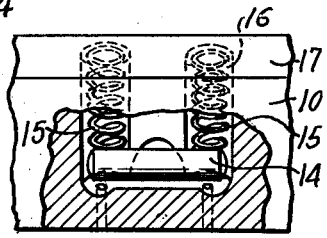
Figure 5 is a fragmentary view of a portion of the fixture to show the retainer pin and coil springs for same.
Figure 2:
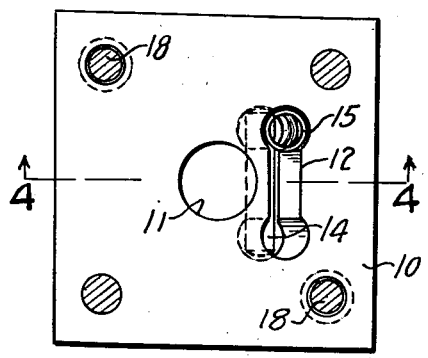
Figure 2 is a top plan view of the fixture, one of the coil springs being removed to show the socket for holding the spring in the desired position.
Figure 4:
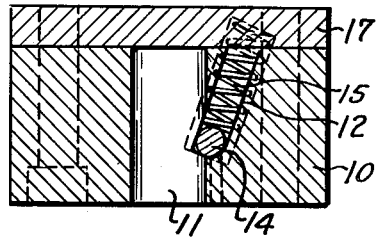
Figure 4 is a transverse sectional view on the line 4—4 of Figure 2.

The illustrated embodiment of the invention comprises a fixture block 10 having a central aperture 11 which is annular in cross section to receive the annular shank of a tool T, which in this instance is a punch. Extending downwardly and inwardly from the upper side of the fixture 10 is an opening 12 which is elongate in cross section and of dumbbell shape. The inclined opening 12 terminates in a curved surface 13 and movable within the opening 12 is an elongate retainer pin 14 which is cylindrical in form and which is placed under tension by a pair of coil springs 15 which engage opposite end portions of the retainer pin 14. The shape of the opening 12 is such as positively to position the coil springs 15 to prevent their shifting laterally relative to each other. In this manner, uniform pressure is imposed on the cylindrical retainer pin 14 and any tendency of the coil springs to shift laterally relative to each other is eliminated.

The upper or outer ends of the springs 15 extend respectively into the socket 16 formed in the under surface of a backing plate 17. The backing plate 17 is secured to the block 10 by a pair of screws 18 in opposite corner portions, dowel pins 19 being arranged in the alternate corners.

The bottom or inner wall of the opening 12 is inclined fifteen degrees from the vertical so as to extend diagonally from the upper end of the block 10 to the tool shank receiving opening 11. The shank of the tool T is formed with an inclined face 20, the angularity of which is approximately twelve degrees from the axis of the tool T. The angularity is such that the retainer pin 14 under the action of the coil springs 15 wedges between the inclined face 20 of the tool shank and the inner wall of the inclined opening 12.

Figure 6:
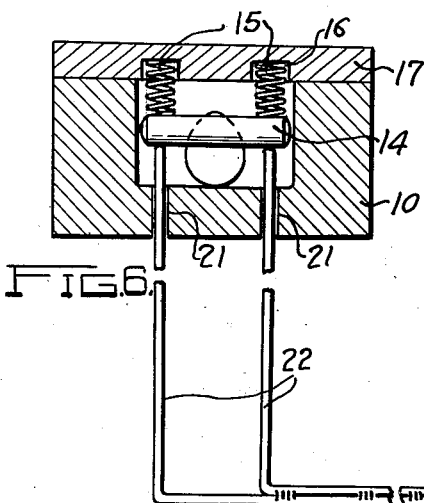
Figure 6 is a sectional view somewhat similar to Figure 5, but showing in elevation a tool for retracting the retainer pin to release the tool.
Figure 3:
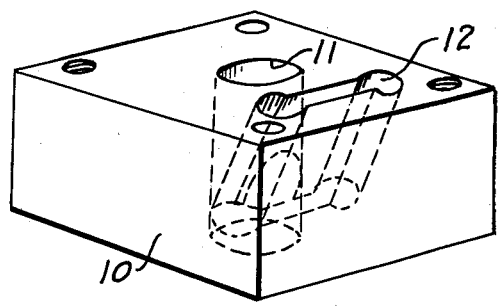
Figure 3 is a perspective view of the fixture shown in Figure 2, but with the retainer and springs removed.

Manifestly, the cylindrical retainer pin 14 partially obstructs the opening 11 so when the tool T is inserted, the retainer pin 14 is pushed rearwardly against the force of the springs 15 until the face 20 becomes aligned with the retainer pin 14. Then the retainer pin will be forced into wedging engagement between the faces 20 and the inner wall of the inclined opening 12, thereby militating against removal of the tool T. To enable the tool T to be removed, a pair of passages 21 lead from the lower end of the block 10 upwardly to the curved surface 13, these passages being spaced laterally from each other so that the tines 22 of a tool 23 may be inserted through the passages 21 to push the retainer pin 14 upwardly or rearwardly as indicated in Figure 6, away from the shank of the tool T to release the latter. The tool 23 is made up of a pair of tines 22 bent at right angles and suitably welded together with the ends fast in a handle 22'. The tool is such that the retainer pin 14 will be moved uniformly out of wedging engagement and prevent cocking or binding of the pin in the inclined opening 12.

This application constitutes a division of my application Serial No. 49,539, filed September 16, 1948, and entitled "Retainer Device for Tools," now forfeited.

It is to be understood that numerous changes in details of construction, arrangement and operation may be effected without departing from the spirit of the invention especially as defined in the appended claims.

What I claim is:

1. A tool retainer comprising a unitary fixture block having a cylindrical tool shank-receiving opening extending therethrough, a backing plate secured to one end of said opening, said block having an inclined opening intersecting said cylindrical opening and with the outer end thereof closed by said backing plate, an elongate cylindrical retainer movable in said inclined opening to a position partially to obstruct said tool shank-receiving opening, there being an arcuate surface in said block at the outer end of said inclined opening for said retainer in the extreme outer position thereof, there being a pair of laterally spaced passages leading from said arcuate surface to the outside in substantially parallel relation to said tool shank-receiving opening thereby to receive the prongs of a tool for forcing the retainer rearwardly in order to release the engaged tool shank, said inclined opening being of dumbbell shape in cross section whereby to provide a pair of spring-receiving sockets at each end thereof, a pair of springs in said sockets resiliently urging said retainer into its obstructing position, and sockets in said backing plate receiving the ends respectively of said springs thereby positively to restrain the springs from lateral shifting movements.

2. A tool retainer comprising a unitary fixture block having a cylindrical tool shank-receiving opening extending therethrough, a backing plate secured to one end of said block and closing one end of said opening, said block having an inclined opening intersecting said cylindrical opening and with the outer end thereof closed by said backing plate, an elongate cylindrical retainer movable in said inclined opening to a position partially to obstruct said tool shank-receiving opening, there being an arcuate surface in said block at the outer end of said inclined opening for said retainer in the extreme outer position thereof, and a pair of springs in said inclined opening resiliently urging said retainer into its obstructing position, said inclined opening being of dumbbell shape in cross section thereby to provide sockets at each end thereof for said springs whereby to hold same in the desired position.

HAROLD W. KOST.

REFERENCES CITED

The following references are of record in the file of this patent:

UNITED STATES PATENTS

| Number | Name | Date |
| --- | --- | --- |
| Re. 19,111 | Harrington | Mar. 13, 1934 |
| 2,089,166 | Reichhordt | Aug. 3, 1937 |
| 2,270,840 | Allen | Jan. 27, 1942 |
| 2,324,852 | Kopczynski | July 20, 1943 |
| 2,405,961 | Lapointe | Aug. 20, 1946 |